UNITED STATES PATENT OFFICE.

JAMES G. STEELE, OF SAN FRANCISCO, CALIFORNIA.

IMPROVEMENT IN COMPOSITIONS FOR THE DESTRUCTION OF VERMIN.

Specification forming part of Letters Patent No. 169,925, dated November 16, 1875; application filed August 5, 1875.

*To all whom it may concern:*

Be it known that I, JAMES G. STEELE, of the city and county of San Francisco, State of California, have invented a new and useful Composition, which compound is fully described in the following specification:

This invention relates to that class of compositions used to destroy, by poisoning, squirrels, rats, gophers, and other like animals; and consists in a composition formed by saturating or charging wheat which has been softened by a limited quantity of water, and heat in a hot-water bath apparatus, with solutions of sulphate of strychnine, corrosive sublimate, acetic acid, and distilled water, and then incorporating with the wheat so charged, by the aid of heat, a mixture of granulated sugar and wheat-flour.

To prepare the composition, take one hundred and twenty-five pounds of cleaned wheat, and introduce it into a hot-water bath apparatus, moisten with two quarts of water, cover, and allow to remain at a heat not to exceed two hundred and forty (240°) degrees Fahrenheit for fifteen minutes. Four ounces of the sulphate of strychnine are now taken and mixed with three pints of distilled water, and enough strong acetic acid added to insure a perfect solution, which is effected by the aid of heat. The resulting liquid is immediately mixed with the wheat, and then a solution made by dissolving sixteen ounces of corrosive sublimate in three pints of boiling distilled water is added, and the whole is then vigorously stirred with a wooden spatula, and allowed to remain at a heat of one hundred and eighty (180°) degrees for fifteen minutes with continued agitation. Twelve and a half pounds of white sugar are next carefully granulated at a heat not to exceed 140°, mixed intimately with five pounds of wheat-flour, and passed through a sieve of thirty meshes to the inch, which process is repeated three times, when a perfect mixture will be formed. This is now added to the mixture of wheat and strychnine above mentioned, the whole thoroughly incorporated together, and allowed to remain at a heat of two hundred and forty (240°) degrees until a thorough mixture has been formed, and the poisoned kernels of wheat are well and uniformly covered with the mixture of flour and sugar.

The whole is now removed from the fire, spread upon suitable trays, and allowed to dry at a temperature of one hundred and ten (110°) degrees.

Contemporaneous herewith, I have made application for a patent for the process of making this composition.

I claim as my invention—

A composition of matter consisting of wheat, sulphate of strychnine, distilled water, acetic acid, corrosive sublimate, granulated sugar, and wheat-flour, all substantially as described, and for the purposes specified.

JAMES G. STEELE.

Witnesses:
LORENZO D. LATIMER,
EDWARD LANDE.